Figure 1:
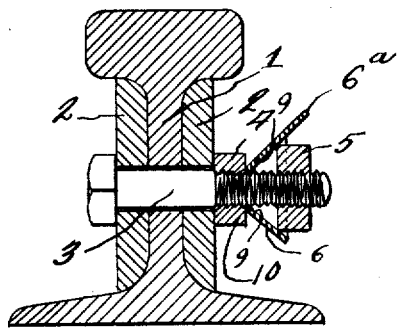

H. L. RICE.
LOCK WASHER FOR NUTS AND BOLTS.
APPLICATION FILED MAR. 22, 1916.

1,201,501.

Patented Oct. 17, 1916.

Witnesses
Philip Ferrell
Frances A. O'niell

Inventor
H. L. Rice

By
D. Swift & Co.
ATS Attorneys

UNITED STATES PATENT OFFICE.

HERBERT LEE RICE, OF MOUNT PULASKI, ILLINOIS.

LOCK-WASHER FOR NUTS AND BOLTS.

1,201,501.　　　　Specification of Letters Patent.　　Patented Oct. 17, 1916.

Application filed March 22, 1916. Serial No. 85,869.

*To all whom it may concern:*

Be it known that I, HERBERT LEE RICE, a citizen of the United States, residing at Mount Pulaski, in the county of Logan, State of Illinois, have invented a new and useful Lock-Washer for Nuts and Bolts; and I do hereby declare the following to be a full, clear, and exact description of the invention, such as will enable others skilled in the art to which it appertains to make and use the same.

This invention relates to the art of nut locks, and more especially to an improved, simple, and efficient locking washer for bolts and nuts particularly nuts.

One of the objects of the invention is to provide a device of this kind, in which simple, efficient and practical features of construction exist.

One of the features of construction is to provide a dished washer, which is substantially rectangular in elevation, and is provided with a plurality of V-shaped slits extending from the central opening of the washer, so that when a nut is threaded home on a bolt, the locking washer will be crushed, particularly the parts of the washer between the slits, thereby causing teeth upon the inner edges of those parts to bite into the threads of the bolt, thereby preventing displacement of the washer.

Another feature of the invention is the provision of a washer of such size that after the parts between the slits are crushed, the portion of the washer beyond the outer ends of the slits may be so arranged against the nut as to prevent the nut from backing off from the bolt, there being a tongue to additionally prevent the nut from backing off.

In practical fields the details of construction may necessitate alterations, falling within the scope of what is claimed.

The invention comprises further features and combination of parts, as hereinafter set forth, shown in the drawings and claimed.

Figure 2:
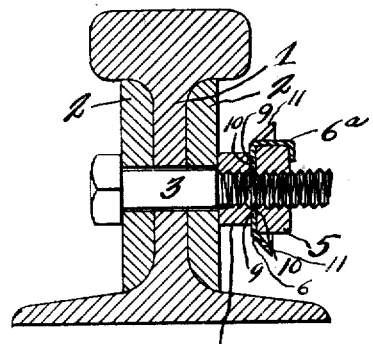
Figure 3:
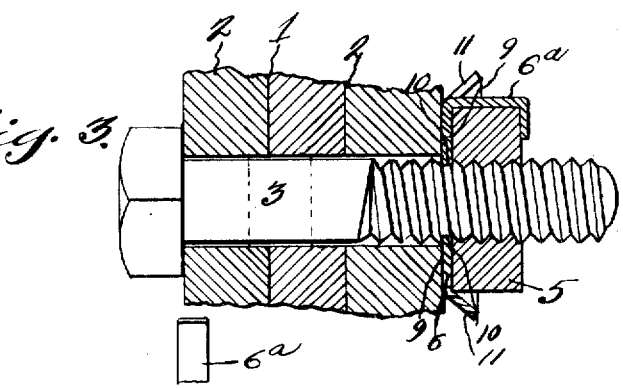
Figure 3:
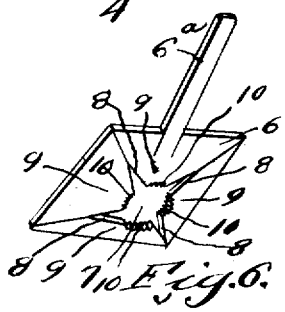
Figure 4:
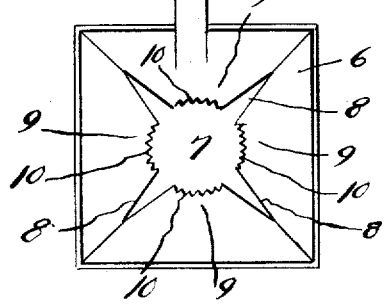
Figure 5:
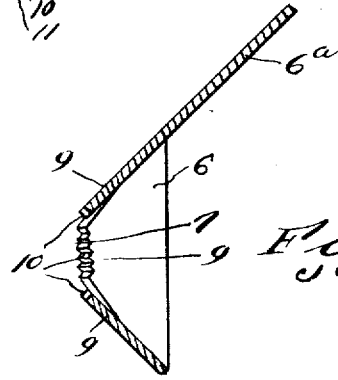

In the drawings: Figure 1 is a sectional view of a rail and the usual fish plates, illustrating a bolt in elevation, and showing the dished rectangular washer between two nuts, ready to be crushed by turning the outermost nut home. Fig. 2 is a similar view showing the washer crushed between the two nuts. Fig. 3 is an enlarged view, showing a bolt having right or left threads, so that the washer will lock in engagement with each of the threads. Fig. 4 is a plan view of the locking washer. Fig. 5 is a sectional view on line 5—5 of Fig. 4. Fig. 6 is a detail perspective view of the washer.

Referring more especially to the drawings, 1 designates a rail, 2 the fish plates, and 3 the bolt, which extends through the web of the rail and said fish plates. A suitable nut is first threaded upon the bolt adjacent to one of the fish plates, and between the nut 4 and a larger nut 5 (which is subsequently applied to the bolt) is a washer 6 rectangular in plan view, but, however, it may be constructed in any other suitable shape. Referring more especially to Figs. 4 and 6, it is to be noted that the washer is dished, and extending radially from the opening 7 of the washer are several V-shaped slits 8, and the parts 9 between the slits are provided with teeth 10 upon their inner edges. It is to be observed that when the washer 5 is turned home substantially half of the dished contour or shape of the washer is crushed between the two nuts 4 and 5. In other words, the parts 9 are crushed flat between the two nuts, thereby closing the V-shaped slits 8, and causing the inner toothed edges of the parts 9 to bite into the threads of the bolt, thereby preventing movement of the washer.

The washer 6 is provided with an elongated laterally extending tongue 6ª, which, after the washer is crushed, may be bent over the nut 5, thereby preventing movement of the nut. However, it is to be noted that the washer is larger than the nut 5, that is, in plan view. In other words, the nut is substantially as wide as the distance from the outer end of one slit 8 to the outer end of an opposite or adjacent slit. Therefore, it is to be noted that when screwing the nut 5 home and crushing the parts 9 so as to force the teeth 10 into the threads of the screw, the outer portions of the washer will overlie the nut 5, as shown at 11, thereby tending to prevent the nut 5 from unscrewing. In fact to insure the security of the nut 5, the parts 11 may be forced toward the nut, that is, not absolutely in contact with the side edge face of the nut, but merely in the direction of the nut, to prevent the same from turning. When the washer is used upon a bolt or other means, or threaded device involving right and left threads, as shown in Figs. 1 and 2, it is to be seen that the teeth 10 of one part 9 will engage, say for instance, the right hand threads, and the teeth 10 of the opposite part will engage the left hand threads, or vice versa. However, in Fig. 3 the left hand threads of the bolt are eliminated, thereby leaving only the right hand threads, and where the washer is provided with a tongue as shown at 6ª, it is only necessary to have one nut.

The invention having been set forth, what is claimed as new and useful is:

As an improved article of manufacture, a lock washer for bolts comprising a plate rectangular in plan view and having a central opening, said plate being dished to V-shaped form in planes at right angles and provided with radial V-shaped slits of lengths substantially half the distance between the opening and the corners of the plate, thereby forming inwardly extending substantially V-shaped tongues, said tongues having their inner edges provided with teeth, said V-shaped slits constituting means whereby the V-shaped inwardly extending tongues may be crushed when the washer is clamped between two nuts, thereby causing the teeth of the tongues to engage the threads of a bolt, the non-crushed portion of the washer beyond the slits acting as means combined with the inner toothed edges of said tongues to prevent the nut from turning, said plate having a laterally extending tongue to overlie one side and the face of the nut to additionally prevent the nut from turning.

In testimony whereof I have signed my name to this specification in the presence of two subscribing witnesses.

HERBERT LEE RICE.

Witnesses:
GROVER H. LANGFELDT,
GEORGE J. SMITH.